United States Patent [19]

Dressler et al.

[11] 4,405,755
[45] Sep. 20, 1983

[54] NOVEL N-METHYLOLATED/METHOXYMETHYLATED ARYLDISULFONAMIDES

[75] Inventors: Hans Dressler, Monroeville, Pa.; Donald A. Lederer; James Noe, both of Wadsworth, Ohio

[73] Assignee: Koppers Company, Inc., Pittsburgh, Pa.

[21] Appl. No.: 329,198

[22] Filed: Dec. 10, 1981

[51] Int. Cl.$^3$ .......................... C08L 7/00; C08L 9/06
[52] U.S. Cl. .................................... 525/138; 521/25; 260/729; 260/775; 260/779 R; 525/139; 564/83
[58] Field of Search ...................... 525/138, 139, 134; 564/83; 260/729, 775, 779 R

[56] References Cited

U.S. PATENT DOCUMENTS 3,617,190  11/1971  Tesoro ............................ 525/61

Primary Examiner—Theodore E. Pertilla
Attorney, Agent, or Firm—Donald M. MacKay; Herbert J. Zeh, Jr.

[57] ABSTRACT

N-methylolated/methoxymethylated aryldisulfonamides useful as rubber crosslinking agents are provided of the general formula:

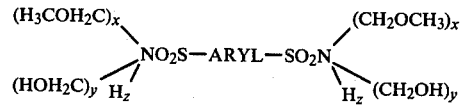

wherein x is between about 1 and 2, and y is between about 1 and 3, z is between about 0 and 1.5, the total of x, y and z being about 4.

17 Claims, No Drawings

NOVEL N-METHYLOLATED/METHOXYMETHYLATED ARYLDISULFONAMIDES

BACKGROUND OF THE INVENTION

This invention is directed to methylolated/methoxymethylated disulfonamides which can be easily prepared and which are useful as crosslinking agents in rubber compositions containing a resorcinol resin or resorcinol.

Methylolated sulfonamides of various types are known. For example, U.S. Pat. No. 3,617,190 to Tesoro is representative. In example 2, methane sulfonamide was converted to the N,N-dimethylol derivative by reaction with 37% aqueous formaldehyde. The mixture was reacted for six hours, allowed to stand for 70 hours and then the product recovered by a rather complex procedure. The present invention provides novel disulfonamides by a simple and inexpensive procedure.

BRIEF DESCRIPTION OF THE INVENTION

The novel disulfonamides of the invention are represented by the following general formula:

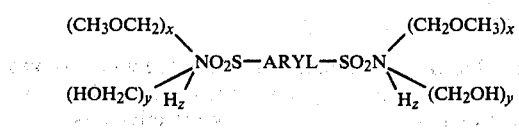

wherein x is between about 1 and 2, and y is between about 1 and 3, z is between about 0 and 1.5, the total of x, y and z being about 4. Typical aryl include benzene, diphenyl ether, naphthalene and the like.

The novel process for preparing these compounds comprises reacting a mixture of from about 2 to 100 moles of methanol, an aryldisulfonamide and 3 to 5 moles of a formaldehyde donor per mole of aryldisulfonamide in the presence of a basic ion-exchange resin, and recovering the resultant product. Typical formaldehyde donors include formaldehyde, methyl formcel, and paraformaldehyde.

DETAILED DESCRIPTION OF THE INVENTION

As illustrated by the above formula, the novel disulfonamides may have a minor amount of H bonded to the N where x and y does not equal 4. Mixed numbers, fractions and whole integers are all represented by x, y and z. Further, both x's or y's need not be the same but they usually are.

The compounds are conveniently prepared using excess methanol as the solvent (a co-solvent, such as water or acetone, can be used) at a temperature between about 40° C. and about 100° C. in a few hours with a catalytic amount of a basic ion-exchange resin. Typical ion-exchange resins include Rexyn 201, Rexyn R205, Amberlite IRA-400, and Dowex 21K in the hydroxide form. The product can then be recovered by evaporating the solvent, if employed.

The following examples will serve to illustrate preferred embodiments of the invention. All parts and percentages in said examples and elsewhere in the specification and claims are by weight unless otherwise indicated.

EXAMPLE 1

A mixture of 1200 ml of methanol, 118 g. (0.5 m.) of m-benzenedisulfonamide, 63 g. (2.0 m.) of powdered paraformaldehyde (95%) and 30 g of Rexyn 201 OH form ion-exchange resin (sold by Fisher Scientific Co.) was agitated and heated under a reflux condenser in a 2-1., round-bottom flask to 50° C. over a one hour period. Water (10 ml) was then added for the purpose of improving the solubility of the reagent; the mixture was heated to 60° C. and maintained at that temperature for two hours. The product was then recovered by filtration to yield a wet cake (wet resin) of 50.9 g. The filtrate was stripped of methanol on a Buchler rotating evaporater to final conditions of about 60° C./50 Torr to provide 158.3 g. of a viscous, oily product. By IR and NMR analysis, the product was indicated to have the following structure.

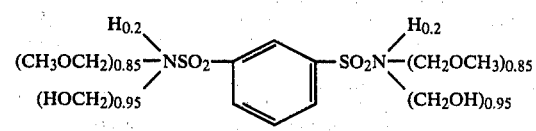

EXAMPLE 2

In order to vary the proportion of methylol and methoxymethyl groups, 74.2 g. of methyl formcel (55% $CH_2O$ in methanol; pH 7.0) was used as the formaldehyde source. The other ingredients were methanol (775 ml.), m-benzenedisulfonamide (76.4 g.), and Rexyn R 205 (32.5 g.). The mixture was agitated and heated under a reflux condenser in a 2-1., round-bottom flask to 50° C. over a 40-minute period, maintained at 50° C. for one hour, heated to 65° C. over a 20-minute period and finally maintained at 65° C. for two hours. The mixture was filtered hot to provide 33.5 g. of wet resin catalyst. The filtrate was evaporated on a Buchler rotary evaporator to 72° C. (pot)/125 Torr to provide 145.5 g. of a sticky, solid product identified by IR and NMR analyses as having the following structure:

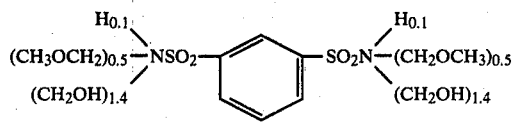

EXAMPLES 3-5

Following the general procedure of Examples 1 and 2, compounds were prepared having the following ratios:

| Reinforcing agent | N—CH$_2$—O—CH$_3$ | N—CH$_2$OH |
|---|---|---|
| Ex 3. | 1.8 | 0.8 |
| Ex 4. | 1.4 | 1.9 |
| Ex 5. | 1.0 | 1.8 |

The compounds can be prepared in a dry-product form by adding silica (e.g., PPG Industries Hi-Sil 215) to the solution before stripping of the solvent.

EXAMPLES 6-11

The products from Examples 1-5 or a commercial crosslinking agent (Cyrez 963 crosslinking agent) and a control were each formulated into rubber compositions. For each product evaluation a masterbatch base rubber composition containing Penacolite Resin B-18-S and no crosslinking agent was mixed and split into two 700 gram batches. Cyrez 963 crosslinking agent liquid was incorporated into one batch and one of the compounds of the invention of Examples 1 to 5 incorporated into the other. The rubber composition formulation is shown in the following Table I:

TABLE I
STANDARD NATURAL SYNTHETIC RUBBER FORMULATION

| Materials | phr |
|---|---|
| Natural Rubber | 46.5 |
| SBR-1500 (Goodrich rubber) | 38.5 |
| Polybutadiene | 15.0 |
| N-550 (FEF) Black | 45.0 |
| Hi-Sil 233 (PPG Industries silica) | 15.0 |
| Stearic Acid | 1.5 |
| Flectol H (Monsanto Co. antioxidant) | 2.0 |
| Sunthene 3125 (Sun Oil Co. process oil) | 5.0 |
| Zinc Oxide | 3.0 |
| Sulfur | 3.0 |
| Santocure NS (Monsanto Co. accelerator) | 1.2 |
| Penacolite Resin B-18-S (Koppers Co.) | 3.85 |
| Cyrez 963 (American Cyanamid Co. cross linking agent) | 2.75 |
| Methylolated/methoxymethylated m-benzenedisulfonamide | 3.76[1] |

[1]Calculated on an "equivalent weight" basis with Cyrez 963; that is; 2.75 g of Cyrez 963 has the same methoxy group functionality as 3.76 g of methylolated/methoxymethylated m-benzenedisulfonamide.

The above ingredients, with the exception of the sulfur and reinforcing agents, were mixed for 10 minutes in a Banbury mixer, the temperature rising to 320° F. during this period. The remaining materials were added when the masterbatch rubber was being milled on a rubber mill at a temperature of 180° F. Two wire pull-out test pads (ASTM D-2229) were made from each compound with 1×5×0.25 mm brass plated steel cord. The pads were vulcanized to their optimum cure.

The pads were tested by cutting them in half (seven wires in each pad) and subjecting two of the halves to aging for 48 hours at 250° F. while holding back their mating halves as room temperature controls.

In Table II, rheometer data shows that the induction time (time to 5-point rise) for the invention compounds is comparable to the commercial material.

TABLE II
RHEOMETER DATA[1] OF COMPOUNDS CONTAINING METHYLOLATED/METHOXYMETHYLATED m-BENZENEDISULFONAMIDES

| Cross-Linking Agent | Control | Ex 1 | Ex 2 | Ex 3 | Ex 4 | Ex 5 | Cyrez 963 |
|---|---|---|---|---|---|---|---|
| Maximum Torque,[2] $M_H$ | 40.8 | 52.4 | 51.2 | 51.8 | 52.7 | 47.1 | 52.0 |
| Minimum Torque, $M_H$ | 10.6 | 12.8 | 12.1 | 12.8 | 12.0 | 10.2 | 9.9 |
| 90% Maximum Torque, $.9M_H$ | 37.8 | 48.4 | 47.3 | 47.9 | 48.7 | 43.4 | 47.8 |
| 5-Point Rise, $M_5$ | 15.6 | 17.8 | 17.1 | 17.8 | 18.0 | 15.2 | 14.9 |
| Time[3] to $M_5$ | 12.6 | 9.8 | 11.1 | 9.5 | 10.0 | 10.3 | 10.0 |
| Time to $.9M_H$ | 17.6 | 13.5 | 47.5 | 32.6 | 35.0 | 38.0 | 43.0 |
| Cure Time | 22.6 | 36.5 | 52.5 | 37.6 | 40.0 | 43.0 | 48.0 |

[1]Monsanto Rheometer 100; 1.66 HZ, ± 1° Arc; 300° F.; type MPC (micro-production control) dies
[2]Rheometer Torque Units
[3]Minutes In Table III, adhesion data is presented which shows that the invention compounds are comparable to the commercial material in reinforcing effectiveness.

TABLE III
ADHESION STUDIES OF VARIOUS METHYLOLATED/METHOXYLATED m-BENZENEDISULFONAMIDE CROSS-LINKING AGENTS[1]

| | 48 hrs. @ 250° F. | | | 72 hrs. @ 185° F.; 100% R.H. | | |
|---|---|---|---|---|---|---|
| | R.T. Control | Aged | % Change | R.T. Control | Aged | % Change |
| BW-29 Wire[2] | | | | | | |
| Control | 36( 0) | 35( 40) | −3 | 34( 10) | 72( 50) | +112 |
| Ex 1 | 117(100) | 44(100) | −62 | 122( 95) | 95( 75) | −22 |
| Ex 2 | 105( 95) | 45(100) | −57 | 107(100) | 92( 95) | −14 |
| Ex 3 | 115( 95) | 46(100) | −60 | 117( 90) | 97( 85) | −17 |
| Ex 4 | 110(100) | 46( 95) | −58 | 121(100) | 87( 80) | −28 |
| Ex 5 | 123(100) | 47(100) | −62 | 122(100) | 94( 80) | −23 |
| Cyrez 963 | 127(100) | 48(100) | −62 | 133(100) | 106( 90) | −20 |
| BW-33 Wire[3] | | | | | | |
| Control | 31( 5) | 26( 25) | −16 | 24( 5) | 46( 10) | +92 |
| Ex 1 | 76( 75) | 35( 60) | −54 | 76( 75) | 60( 60) | −21 |
| Ex 2 | 89( 65) | 37( 70) | −58 | 87( 75) | 79( 85) | −9 |
| Ex 3 | 84( 50) | 35( 50) | −58 | 82( 50) | 65( 50) | −21 |
| Ex 4 | 87( 65) | 38( 50) | −56 | 84( 75) | 72( 60) | −14 |
| Ex 5 | 86( 70) | 37( 75) | −57 | 85( 80) | 69( 50) | −19 |
| Cyrez 963 | 102( 75) | 44( 75) | −57 | 86( 70) | 82( 50) | −5 |
| BW-23 Wire[4] | | | | | | |
| Control | 115( 20) | 99( 85) | −14 | 118( 20) | 165( 85) | +40 |
| Ex 1 | 266(100) | 104(100) | −61 | 256(100) | 225( 75) | −12 |
| Ex 2 | 258(100) | 118(100) | −54 | 258(100) | 252(100) | −2 |
| Ex 3 | 264( 95) | 121(100) | −54 | 253( 95) | 222( 80) | −12 |
| Ex 4 | 259( 95) | 121( 95) | −53 | 256( 95) | 236( 85) | −8 |
| Ex 5 | 273(100) | 123(100) | −55 | 264( 95) | 245( 80) | −7 |
| Cyrez 963 | 289(100) | 138(100) | −52 | 287(100) | 256( 95) | −11 |

[1]The first number is pull out force in pounds; the second number (in parenthesis) is % Rubber Coverage
[2]ASTM D-2229 - ½" embedment 1 × 5 × 0.25 mm (Bekeart)
[3]ASTM D-2229 - ½" embedment 1 × 5 × 0.25 mm (Enka)
[4]ASTM D-2229 - 1" embedment 1 × 3 + 5 × 7 × 0.15 mm (Bekeart)

While the above examples are illustrative of the invention, obvious modifications and variations may occur to one skilled in the art. Accordingly the invention is intended to be limited only by the appended claims.

What is claimed is:

1. Methylolated/methoxymethylated disulfonamides of the general formula:

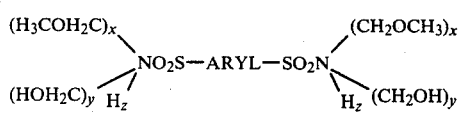

wherein x is between about 1 and 2, and y is between about 1 and 3, z is between about 0 and 1.5, the total of x, y and z being about 4.

2. The disulfonamide of claim 1 wherein the total of x is about 1.7 and the total of y is about 1.9 and wherein about 0.4 H is bonded to the N.

3. The disulfonamide of claim 1 wherein the total of x is about 1.8 and the total of y is about 0.8.

4. The disulfonamide of claim 1 wherein the total of x is about 1.4 and the total of y is about 1.9.

5. The disulfonamide of claim 1 wherein the total of x is about 0.95 and the total of y is about 2.8

6. The disulfonamide of claim 1 wherein the total of x is about 1.0 and the total of y is about 1.8.

7. The disulfonamide of claim 1 wherein the aryl is benzene diphenyl ether or naphthalene.

8. The disulfonamide of claim 1 wherein the aryl is benzene.

9. A vulcanizable rubber composition for adhesion to tire cord comprising a major proportion of rubber and a minor reinforcing amount of a resorcinol donor and a methylolated/methoxymethylated disulfonamide of the general formula:

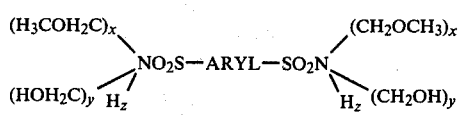

wherein x is between about 1 and 2, and y is between about 1 and 3, z is between about 0 and 1.5, the total of x, y and z being about 4.

10. The composition of claim 9 wherein the aryl is benzene, diphenyl ether or naphthalene.

11. The composition of claim 9 wherein the aryl is benzene.

12. A method for preparing methylolated/methoxymethylated disulfonamides of the general formula:

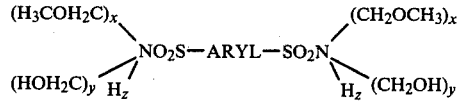

wherein x is between about 1 and 2, y is between about 1 and 3, z is between about 0 and 1.5, the total of x, y and z being about 4, comprising reacting a mixture of from 2 to 100 moles of methanol, one mole of aryldisulfonamide, and 3 to 5 moles of a formaldehyde donor in the presence of a catalytic amount of a basic ion-exchange resin and recovering the resultant product.

13. The method of claim 12 wherein methanol is employed as a solvent.

14. The method of claim 12 wherein the formaldehyde donor comprises methyl formcel.

15. The method of claim 12 wherein the formaldehyde donor consists essentially of formaldehyde or its polymers.

16. The method of claim 12 wherein the aryl is benzene, diphenyl ether or naphthalene.

17. The method of claim 12 wherein the aryl is benzene.

* * * * *